June 13, 1933. J. R. COE 1,913,975
WORKTABLE
Filed July 6, 1931 3 Sheets-Sheet 1
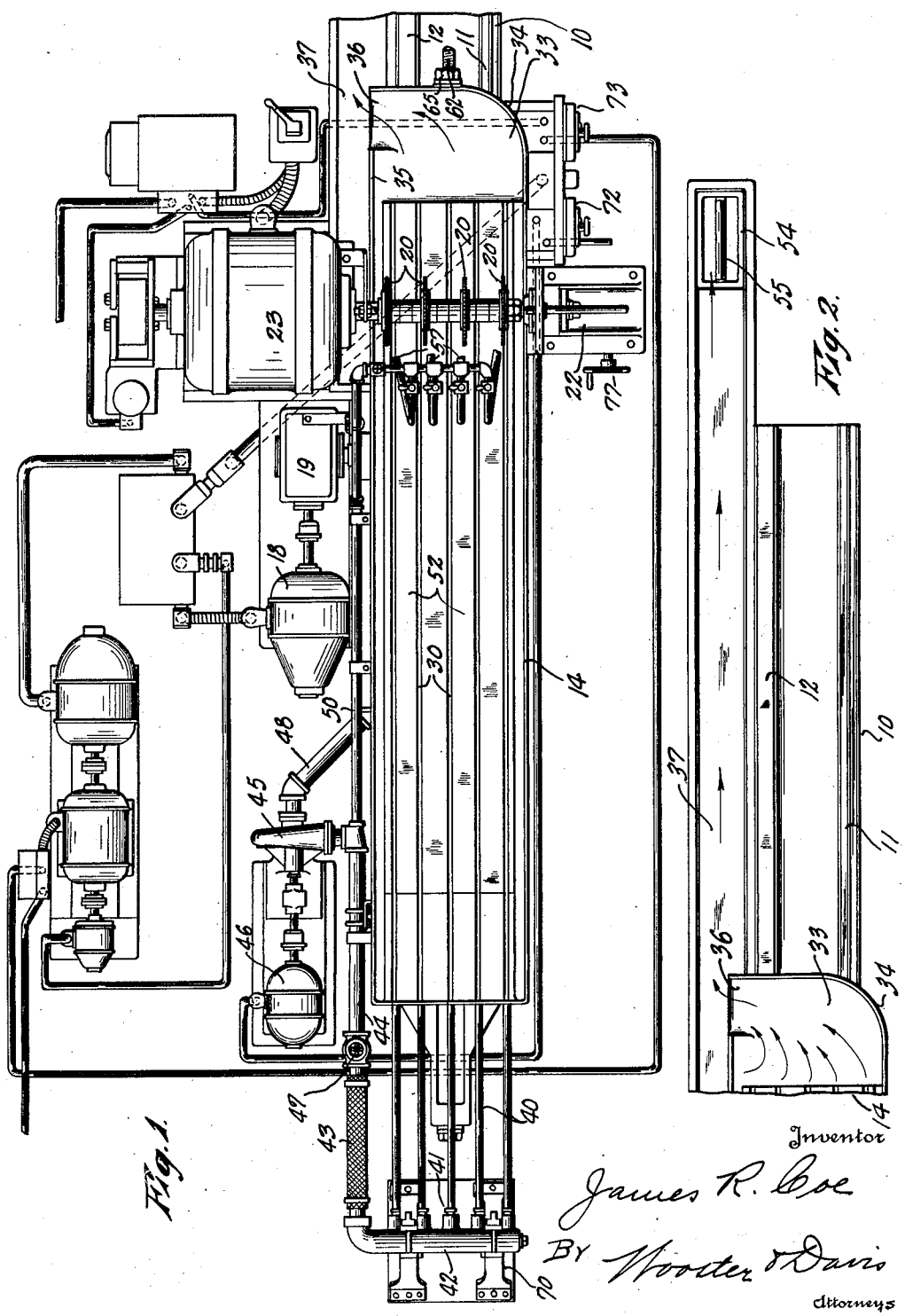

June 13, 1933.  J. R. COE  1,913,975
WORKTABLE
Filed July 6, 1931   3 Sheets-Sheet 2

Inventor
James R. Coe
By Wooster & Davis
Attorneys.

June 13, 1933.  J. R. COE  1,913,975
WORKTABLE
Filed July 6, 1931   3 Sheets-Sheet 3
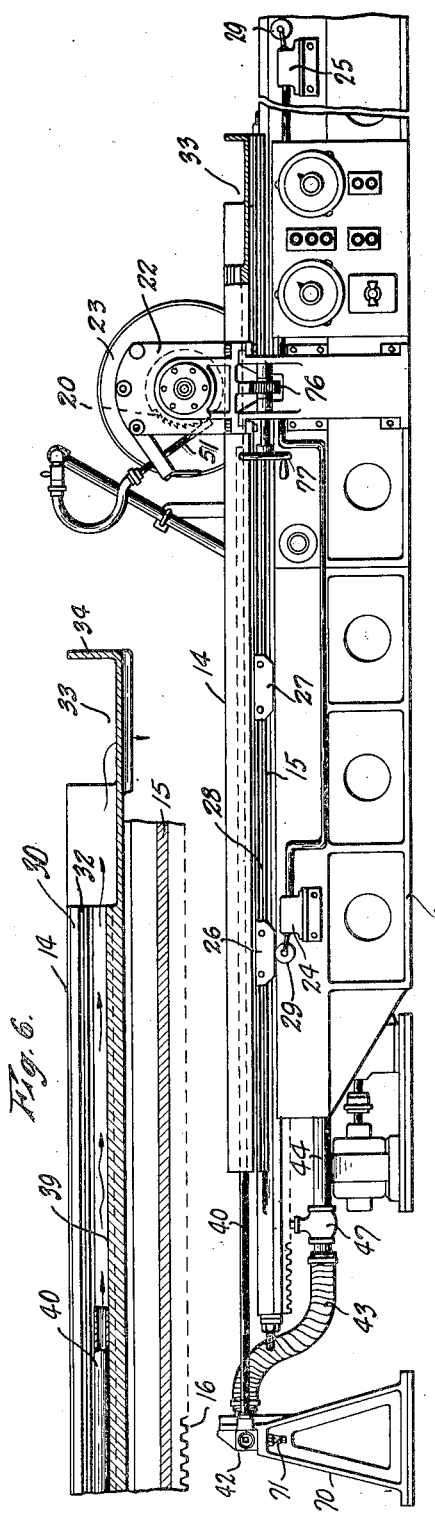
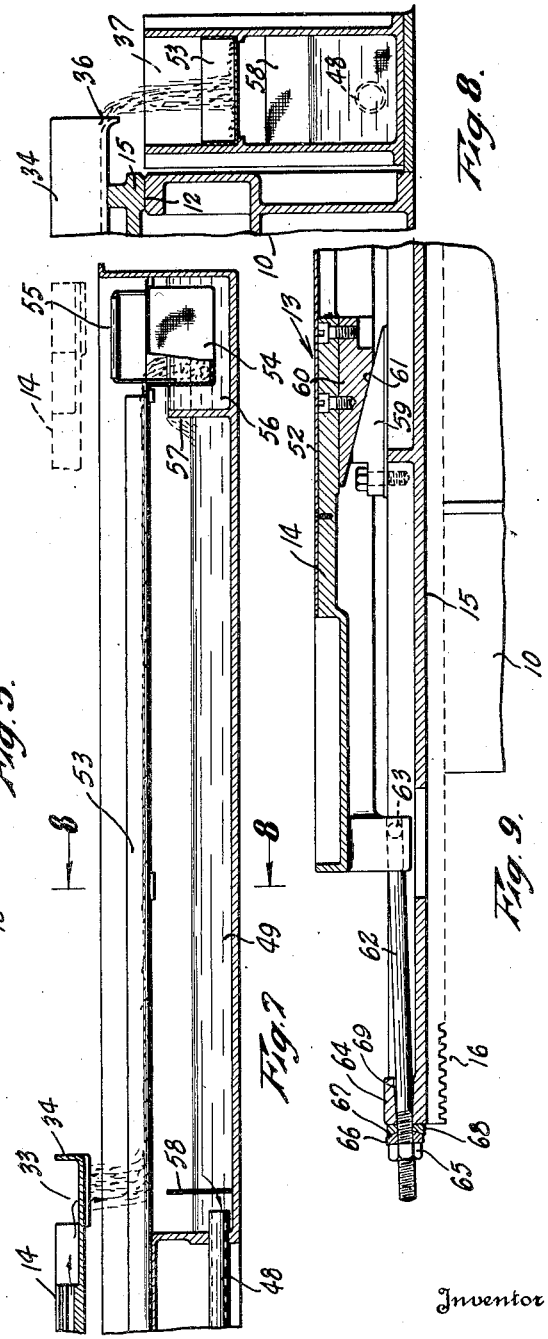
Inventor
James R. Coe
By Wooster & Davis
Attorneys Patented June 13, 1933

1,913,975

UNITED STATES PATENT OFFICE

JAMES R. COE, OF WATERBURY, CONNECTICUT, ASSIGNOR TO THE AMERICAN BRASS COMPANY, OF WATERBURY, CONNECTICUT, A CORPORATION OF CONNECTICUT

WORKTABLE

Application filed July 6, 1931. Serial No. 548,749.

This invention relates to a saw or similar tool for cutting various metals.

In mills where different alloys are made, particularly in brass mills where a large number of different alloys are produced it is very important that all chips, waste and scrap of each alloy or composition of metals be kept separate or segregated so that they cannot mix with other alloys or compositions. It will be evident that if one alloy or composition were allowed to mix with other alloys or compositions then serious difficulty might be encountered when the scrap is remelted with new metals.

It is therefore an object of the present invention to provide a saw or similar machine in which the chips removed by the saw or cutters from any given alloy or composition can be easily kept separate from all other alloys, and therefore the usual difficulties encountered by mixing the chips of various alloys are obviated.

Another object of the invention is to provide a new construction and arrangement of the table for carrying the work which will permit of adjustment of the table relative to the cutters and which will facilitate attaining of the foregoing objects, and will also facilitate operation and adjustment of the machine.

With the foregoing and other objects in view the invention consists in certain novel features of construction, combinations and arrangements of elements as will be more fully disclosed in connection with the accompanying drawings.

In these drawings:

Fig. 1 is a top plan view of a machine involving my new construction with the right hand end portion of the bed broken off;

Fig. 2 is a top plan view of this right hand end portion of the bed and including a portion of the table;

Fig. 5 is a front elevation of the machine with parts broken away to more clearly show the construction;

Fig. 6 is a longitudinal vertical section through one end portion of the table;

Fig. 7 is a longitudinal vertical section through a portion of the collection means for the liquid and chips;

Fig. 8 is a transverse section on an enlarged scale substantially on line 8—8 of Fig. 7; and Fig. 9 is a vertical longitudinal section of the left hand end of the work table.

Figures 3, 4:
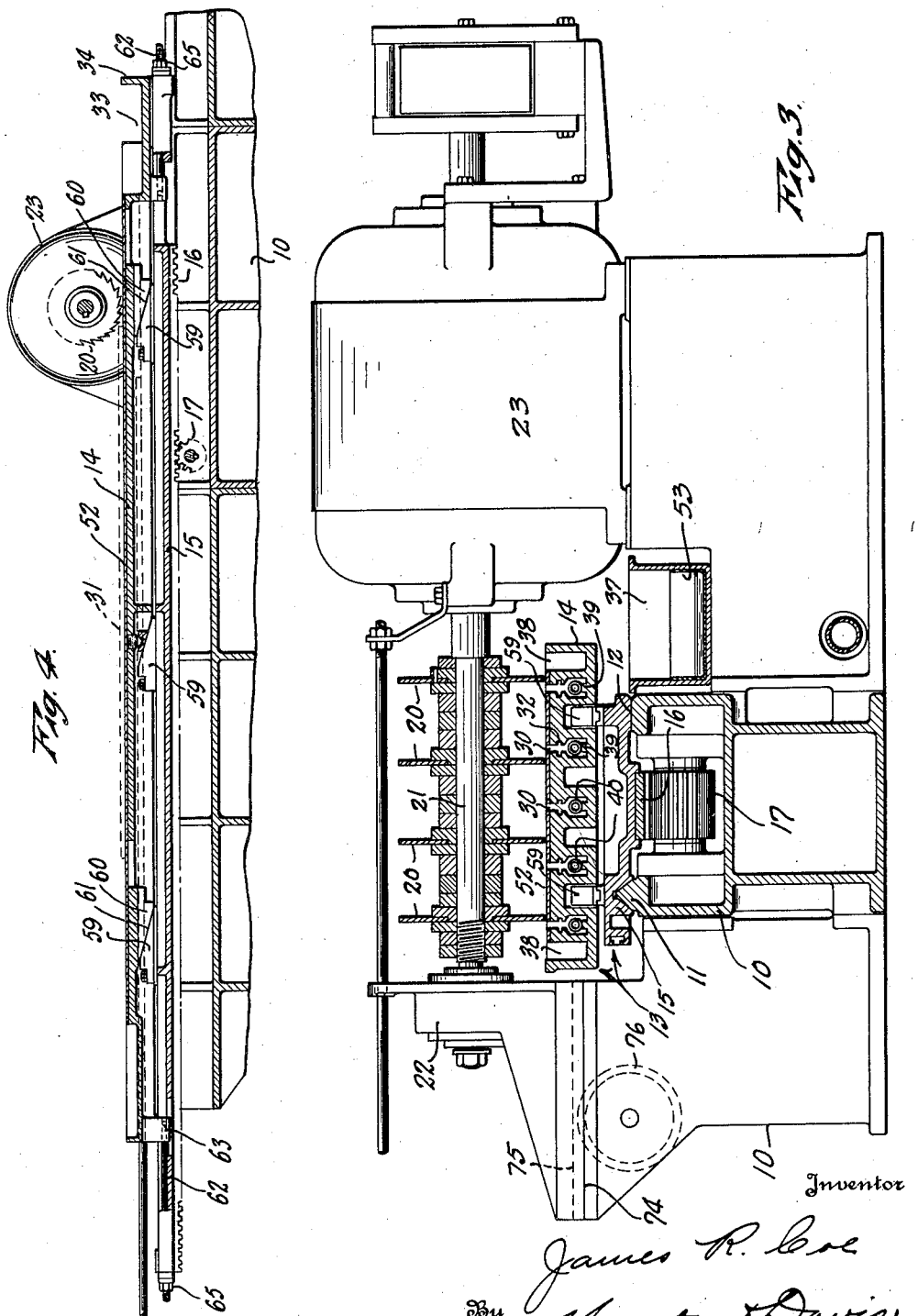
Fig. 3 is a transverse vertical section of the machine.
Fig. 4 is a longitudinal vertical section through the table and the upper portion of the bed.

The machine as illustrated in the drawings is a machine having one or more saws for cutting plates or strips of metal longitudinally, but it will of course be understood that the principles of the invention can be applied to other machines in which there are tools for cutting the work to produce scrap. In other words the invention is not necessarily limited to use with saws.

The machine illustrated comprises a bed 10 on which is mounted various working parts, and which has longitudinal guideways 11 and 12 for the work carrying table indicated as a whole at 13, but which table is composed of an upper section 14 and a lower section 15. The lower section 15 has complementary guides to run on the guideways 11 and 12 and also has means by which the table may be reciprocated on its guide or runways such as the rack 16 meshing with a pinion 17 operated by any suitable means such as an electric motor 18 driving the pinion through a suitable speed reducing mechanism 19. The upper section 14 of the table is adjustably mounted on the lower section 15 as will later be described so that it may be raised or lowered with respect to the cutting tools such as the saws 20. As shown there are four of these saws mounted on the shaft 21, but of course, only one or more of these saws or cutting tools may be used as is found desirable. The shaft 21 is supported at its outer end by a bracket 22 carried by the bed 10 giving a very rigid support for the free end of the shaft so that the tools are held in proper relation to the work, and the shaft and the saws are driven by any suitable means, such as the electric motor 23. During the operation of the machine the saws or cutters are operated by the motor 23 while the table is reciprocated by the motor 18 to carry the work past the cutters. Means are provided for automatically stopping the table at the end of each stroke in either direction such for example as switches 24 and 25 controlling the control mechanism for the motor 18 and which switches are operated by cams 26 and 27 respectively, adjustably mounted in suitable guides 28 on the side of the table and operating rollers 29 for operating the switches. The drive is so designed and controlled that the reverse movement of the table is at a much higher speed than the forward or feeding movement, but this control means and the control for the various motors is not shown in detail on the drawings as they form no part of my present invention.

The upper section 14 of the table is substantially flat on its upper surface and has any desired number of longitudinally extending slots 30 opening through the top of the table for mounting and adjustably holding the usual work holding clamps not shown, for clamping the sheet of metal indicated by the dotted lines 31, Fig. 4, and below the top of the table the side walls of these slots are provided with lateral grooves 32 for the heads of the bolts of these work clamps so that in effect these are T-slots for adjustably holding the usual work clamps. These slots, however, are deeper than ordinary and are closed on the under side so that they do not pass through the lower wall of the table. They do, however, communicate at their right hand ends as viewed in Fig. 1 with a chute or liquid collecting means 33 forming a part of the table and moving with it. This chute is surrounded by upright side walls 34 and 35 except at a point 36 which provides discharge means for conducting the liquid from the collecting means 33 into a trough 37 extending longitudinally along the side of the table. Also on opposite sides of the central portion of the table provided with the slots 30 are longitudinal troughs or grooves 38 opening through the top of the table and communicating with the liquid collecting means 33. On their lower walls the slots 30 are provided with upwardly extending longitudinal ribs 39 on which rest liquid discharge pipes 40, there being a discharge pipe for each slot projecting into it from the left hand end of the table as viewed in Fig. 1, and each connected by a detachable connection 41 with a header 42 supplied with cooling liquid through a flexible pipe 43 from the discharge pipe 44 of a pump 45 operated by any suitable means such as an electric motor 46. The flow from the pump may be controlled by a valve 47, and the suction or inlet pipe 48 of the pump leads to a sump or tank 49 in the rear section of the bed. A branch pipe 50 leads from the discharge of the pump to a series of discharge nozzles 51 in front of the saws or cutters 20 so as to discharge cooling liquid on to the work and the saws to prevent overheating during the sawing operation. If desired the top of the table may be covered with protective plates such as the brass plates 52.

To the rear of the table and extending longitudinally thereof is the trough 37 open at the top and preferably provided with a removable lining 53 which can be removed for cleaning out all chips which might be collected in it. This trough is of a length to extend under the discharge 36 from the table for its entire movement, and therefore collects this discharge during the entire movement of the table. At one end this trough discharges into a screen basket 54 which is removably mounted by any suitable means and preferably has a handle 55 for easy handling. This basket extends into a well 56 formed by a transverse wall 57 and the liquid flows over this wall into the sump or reservoir 49. At its opposite end reservoir 49 may have a screen 58 in front of the suction pipe 48.

As indicated above the work carrying table comprises two sections 14 and 15, and the upper section 14 is mounted on the lower section so as to be adjustable up and down toward and from the saws or cutters 20 to thus properly position the work and the table with the respect to the cutters. I have provided an improved means for so mounting the upper sections of the table which comprises cam blocks 59 carried by the lower section and blocks 60 carried by the upper sections resting on the inclined surfaces 61 of the lower cam blocks. The upper cam blocks also preferably have inclined surfaces corresponding to that of the lower cams. At each end of the table are means for shifting the upper section 14 longitudinally so that the cam surfaces of these supporting blocks adjust the upper section up or down. Thus there is provided at each end of the table a rod 62 connected to the upper section at 63 and passing through a boss 64 on the lower section to which it is connected by adjusting nut 65 engaging a washer 66 having a rounded surface 67 engaging a similar washer 68 to maintain a uniform bearing regardless of the position of the section 14 and therefore the rod 62, the opening 69 in the boss 64 being tapered to allow for the required rocking movement. It will be evident that by loosening the nuts 65 at the right hand end of the table and tightening the nut 65 at the left hand end of the table the upper section 14 may be shifted to the left on the lower section 15, and that by riding up the inclined cam surface 61 will be raised accordingly. The reverse operation will of course lower the upper section as desired.

It will be evident from the foregoing description that the upper section of the table is entirely closed on its under side so that no chips can pass through the table, but will be collected on the top of the table and in the slots 30 and troughs 38. The chips which do collect on the top of the table will probably be washed into the slots 30 or troughs 38 by the cooling liquid from the nozzles 51, and the chips in the slots 30 will be washed along these slots in the collecting chute 33 by the cooling liquid discharged through the discharge nozzles 40. During the movement of the table these discharge nozzles 40 will rest lightly on the ribs 39 at the bottom of the slots 30 and these ribs will slide along under the nozzles as the table moves so that as fast as the chips form and drop down into the slots they are washed out into the chute 53. It will be noted that except for the slots 30 the entire top of the table is open so that for changing the machine for cutting one alloy to another the operator can easily brush all the chips into the chute 30, and any that are not washed by the liquid into the trough 37 can be easily collected or brushed into this trough and collected. The chips carried by the flow of the liquid from this trough will be collected in the screen basket 54 and can be easily removed and kept separate, and the trough 37 being entirely open can be easily cleaned of any chips that may be collected therein. It will therefore be evident that with this construction and arrangement all the alloys can be easily kept separate from each other.

To permit of the adjustment of the upper section 14 of the table and maintain the nozzles or pipes 40 in proper relation thereto, the header 42 for supplying these nozzles may be mounted on a suitable support 70 and adjustable up and down thereon by adjusting screws 71 to adjust the level of the header to correspond to the level of the upper section. This adjustment of the header is permitted by the flexible supply pipe 43.

Suitable control mechanism is provided for the various motors, there being a control box 72 for the motor 46 of the pump and a control box 73 for the motors for driving the saws and the feed mechanism, these all being located where they are easily accessible preferably at the front of the machine, but as they form no part of my present invention they are not shown in detail.

Also the bracket 22 for supporting the free end of the saw shaft 21 may be mounted in transverse guideways 74 on the bed of the machine and carry a rack 75 meshing with the pinion 76 operated by a hand crank 77 so that the bracket 22 may be easily shifted outwardly for changing or adjusting the saws or cutters 20.

Having thus set forth the nature of my invention, what I claim is:

1. In a machine of the character described, a reciprocable work carrying table provided with longitudinal extending shouldered slots for work holding clamps, said slots being closed on their under sides and discharging at one end into a discharge chute, liquid discharge pipes extending into the other ends of the slots and discharging in a direction longitudinally of the slots toward the discharge ends, means mounting said pipes to extend into the slots throughout the travel of the table, means for supplying liquid under pressure to said pipes, and means for reciprocating the table.

2. In a machine of the character described, a work carrying table provided with one or more longitudinally extending shouldered slots for work holding devices, said slots being closed at their under sides and discharging at one end into a chute, liquid discharge pipes projecting into the other ends of the slots below the work holding devices and discharging toward the discharge end of the slots, means for supplying liquid under pressure to said pipes, means for reciprocating the table, said pipes being of sufficient length to extend into the slots throughout the movement of the table, a trough into which the chute discharges during its reciprocating movement, and collecting means for metal chips into which said trough discharges.

3. In a machine of the character described, a work carrying table provided with one or more longitudinally extending shouldered slots for work holding devices, said slots being closed at their under sides and each having an upwardly extending longitudinal rib on its bottom wall, a stationary liquid discharge pipe extending longitudinally into each slot from one end and resting on said rib, said slot discharging at its opposite end into a discharge chute, means for supplying liquid under pressure to said pipes, and means for reciprocating the table.

4. In a machine of the character described, a reciprocable work table having a series of longitudinal slots opening through the top wall thereof and providing liquid passages within the table discharging into a chute at one end, a plurality of liquid discharge pipes extending longitudinally into said passages at their other ends and discharging toward said chute, means for supplying liquid under pressure to said pipes, means for reciprocating the table, said pipes being of sufficient length to extend into the passages throughout the movement of the table, a longitudinal trough into which said chute discharges as the table reciprocates, and a chip collecting means to receive the discharge from the trough.

5. In a machine of the character described, a work carrying table comprising upper and lower sections, supporting guides for the lower section to permit longitudinal movement, means for adjusting the upper section up and down on the lower section to adjust its position, said upper section being provided with longitudinal slots opening through its upper surface and providing conduits in the section closed at their lower sides, said conduits discharging at one end into a chute, liquid discharge pipes extending into the conduits at the other end and discharging toward the discharge ends of the conduits, a flexible connection to said pipes to permit them to move with adjustment of the table, and means of supplying liquid under pressure to the pipes.

6. In a machine of the character described, a bed, a work carrying table on the bed comprising upper and lower sections, supporting guides for the lower section to permit longitudinal movement, means for reciprocating the table, means for adjusting the upper section up and down on the lower section to adjust its position, said upper section being provided with longitudinal slots opening through its top surface and closed at their lower sides, said slots discharging into a chute at one end, liquid discharge pipes extending longitudinally into said slots at the other end and discharging toward the discharge ends of the slots, means for supplying liquid under pressure to said pipes including flexible connection to permit the pipes to move up and down to correspond with adjustment of the upper section, a trough extending longitudinally of the table into which the chute discharges as the table reciprocates, and a chip collecting means to receive the discharge from the trough.

7. In a machine of the character described, a bed, a work carrying table on the bed, supporting guides for the table to permit longitudinal movement, means for reciprocating the table, said table being provided with longitudinal slots opening through its top surface and closed at their lower sides, said slots discharging into a chute at one end, liquid discharge pipes extending longitudinally into said slots at the other end and discharging toward said chute, means for mounting the pipes to extend into the slots throughout the movement of the table, means for supplying liquid under pressure to the pipes, a trough extending longitudinally of the table into which the chute discharges as the table reciprocates, and means for collecting chips from the trough.

In testimony whereof I affix my signature.

JAMES R. COE.